United States Patent
Bykova et al.

(10) Patent No.: US 11,161,743 B2
(45) Date of Patent: Nov. 2, 2021

(54) APPLYING MICRON DIAMETER YARNS

(71) Applicant: Lintec of America, Inc., Richardson, TX (US)

(72) Inventors: Julia Bykova, Richardson, TX (US); Marcio D. Lima, Richardson, TX (US)

(73) Assignee: LINTEC OF AMERICA, INC., Richardson, TX (US)

(*) Notice: Subject to any disclaimer, the term of this patent is extended or adjusted under 35 U.S.C. 154(b) by 156 days.

(21) Appl. No.: 16/390,130

(22) Filed: Apr. 22, 2019

(65) Prior Publication Data

US 2019/0345034 A1 Nov. 14, 2019

Related U.S. Application Data

(60) Provisional application No. 62/668,961, filed on May 9, 2018.

(51) Int. Cl.
| | |
|---|---|
| *C01B 32/16* | (2017.01) |
| *B32B 37/12* | (2006.01) |
| *B82Y 30/00* | (2011.01) |
| *B82Y 40/00* | (2011.01) |
| *B29K 105/16* | (2006.01) |

(52) U.S. Cl.
CPC .............. *C01B 32/16* (2017.08); *B32B 37/12* (2013.01); *B29K 2105/167* (2013.01); *B82Y 30/00* (2013.01); *B82Y 40/00* (2013.01); *C01B 2202/08* (2013.01)

(58) Field of Classification Search
CPC ... A41G 5/02; B05D 5/10; B05D 1/02; B05B 13/0292; B05B 13/0421; B05B 13/0228
See application file for complete search history.

(56) References Cited

U.S. PATENT DOCUMENTS

| | | | |
|---|---|---|---|
| 3,814,338 A * | 6/1974 | Schippers | B65H 54/34 242/476.4 |
| 9,233,492 B2 | 1/2016 | Zhang et al. | |
| 9,348,280 B2 | 5/2016 | Lee et al. | |
| 2004/0241415 A1 | 12/2004 | Wadahara et al. | |
| 2012/0294659 A1 | 11/2012 | Lee et al. | |
| 2012/0295109 A1 | 11/2012 | Jirsak et al. | |

(Continued)

FOREIGN PATENT DOCUMENTS

EP 0578395 B1 9/1996

OTHER PUBLICATIONS

International Search Report and Written Opinion recieved for PCT/US2019/028443, dated Jul. 16, 2019. 8 pages.

*Primary Examiner* — Vishal I Patel

(74) *Attorney, Agent, or Firm* — Greenblum & Bernstein, P.L.C.

(57) ABSTRACT

Placement of nanofibers and yarns comprised of nanofibers onto a substrate are described. The nanofiber yarns are difficult to manipulate with precision given that the diameters can be as little as 5 microns or even less than one micron. As described herein, a placement system is described that can place nanofiber yarns on a substrate at pitches less than 100 μm, less than 50 μm, less than 10 μm, and in some embodiments as low as 2 μm. In part, this precise placement at small pitches is facilitated by the use of coarse and fine adjustment translators, and a guide connected to a compliant flange. The compliant flange and the guide facilitate consistency of location of a nanofiber yarn.

12 Claims, 7 Drawing Sheets

(56) References Cited

U.S. PATENT DOCUMENTS

| | | |
|---|---|---|
| 2015/0044383 A1 | 2/2015 | Kim et al. |
| 2015/0147573 A1* | 5/2015 | Zhang ................... C01B 32/18 |
| | | 428/408 |
| 2017/0137290 A1 | 5/2017 | Zhang et al. |

* cited by examiner

Nanofiber forest

Example reactor for growing nanofibers

Nanofiber sheet

Drawing a Nanofiber Sheet from a Nanofiber Forest

SEM image of nanofiber yarn

APPLYING MICRON DIAMETER YARNS

TECHNICAL FIELD

The present disclosure relates generally to application of yarns to a surface. Specifically, the present disclosure is directed to systems and methods for applying micron diameter yarns to a surface.

BACKGROUND

Nanofibers are known to have unusual mechanical, optical, and electronic properties. However, nanofibers have yet to be integrated into many commercially available products despite their unusual properties. Nanofiber yarns are one form of nanofibers that may have commercial appeal due to the ability to tune the yarn properties by including materials and fibers within the nanofiber yarn other than the nanofibers themselves.

SUMMARY

Example 1 is a method for applying a nanofiber yarn to a substrate, the method comprising: threading a leading end of a nanofiber yarn through a guide defining a channel, the guide proximate to a substrate; connecting the leading end of the nanofiber yarn with the substrate; and applying a tensile force to the nanofiber yarn, the tensile force causing a portion of the nanofiber yarn to come into compliance with an edge of the guide, the channel limiting movement of the nanofiber yarn in response to the applied tensile force on the nanofiber yarn.

Example 2 includes the subject matter of Example 1, wherein the tensile force is from 0.1 milliNewtons (mN) to 10 mN.

Example 3 includes the subject matter of either one of Example 1 or Example 2, wherein applying the tensile force comprises rotating a cylindrical substrate so as to draw the yarn through the channel at a first rate.

Example 4 includes the subject matter of Example 3, wherein applying the tensile force further comprises providing the nanofiber yarn at a second rate different from the first rate, the difference between the first rate and the second rate causing the tensile force to be applied to the nanofiber yarn.

Example 5 includes the subject matter of any of the preceding Examples, further comprising placing a compliant flange in contact with the substrate, the compliant flange attached to the guide and providing a resilient force for maintaining a uniform distance between the guide and the substrate during relative movement between the guide and substrate.

Example 6 includes the subject matter of any of the preceding Examples, further comprising causing relative movement between the guide and substrate for causing a length of nanofiber yarn to be attached to the substrate.

Example 7 includes the subject matter of Example 6, wherein causing the relative movement between the guide and the substrate comprises rotating the substrate.

Example 8 includes the subject matter of Example 6, wherein causing the relative movement between the guide and the substrate comprises laterally translating the substrate and the guide relative to one another.

Example 9 includes the subject matter of any of the preceding Examples, further comprising: applying a first portion of the nanofiber yarn to the substrate; and applying a second portion of the nanofiber yarn to the substrate proximate to the first portion of the nanofiber yarn at pitch of less than 10 microns.

Example 10 includes the subject matter of Example 9, wherein the pitch is approximately 2 µm.

Example 11 includes the subject matter of Example 10, wherein the first portion and the second portion are discontinuous from one another.

Example 12 includes the subject matter of any of the preceding Examples, wherein the nanofiber yarn has a diameter of less than 5 microns.

Example 13 includes the subject matter of any of the preceding Examples, wherein the nanofiber yarn is a multi-ply yarn.

Example 14 is a nanofiber yarn placement system comprising, a yarn dispenser assembly; and a placement assembly comprising: a compliant flange; and a guide connected to the compliant flange, the guide defining a channel, the channel comprising at least one internal surface and at least one corner defined by the at least one internal surface.

Example 15 includes the subject matter of Example 14, wherein the compliant flange is connected to the placement assembly.

Example 16 includes the subject matter of Example 14, further comprising a nanofiber yarn disposed at least within the yarn dispenser assembly.

Example 17 includes the subject matter of any of Examples 14-16, further comprising a substrate.

Example 18 includes the subject matter of Example 17, wherein the substrate comprises an adhesive surface.

Example 19 includes the subject matter of Example 17, wherein the substrate comprises a thermoplastic.

Example 20 includes the subject matter of Example 17, wherein the substrate further comprises a removable surface.

Example 21 includes the subject matter of Example 17, wherein the compliant flange is in contact with the substrate.

Example 22 includes the subject matter of any of Examples 14-21, wherein the at least one internal surface of the guide comprises a first internal surface and a second internal surface that meet at a first corner at an angle from 30° to 90°. as measured at least 0.1 mm away from the corner on two adjacent surfaces.

Figure 1:
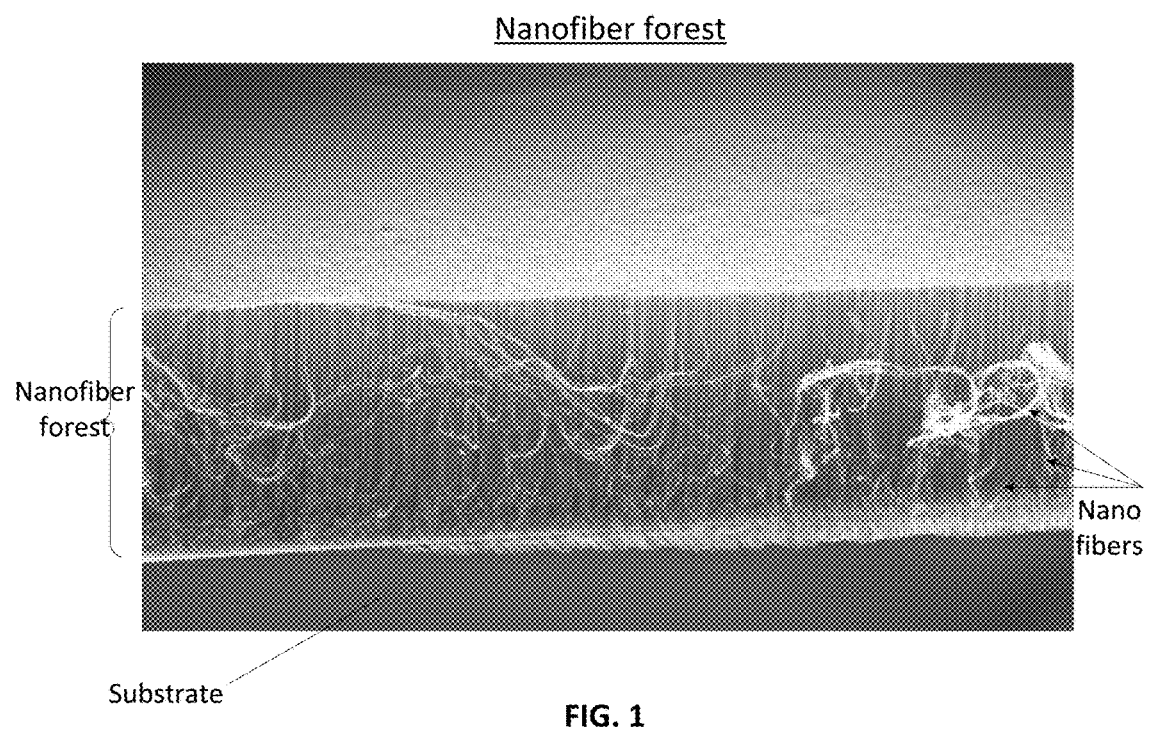
FIG. 1 illustrates an example forest of nanofibers on a substrate, in an embodiment.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

The manipulation of nanofibers and nanofiber yarns can be challenging. Nanofibers can have diameters in the tens of nanometers. Nanofiber yarns (whether single-ply or multi-ply) can have diameters (or average diameters over a length of yarn) as small as a few microns ($\mu m$) and have lengths that are over one kilometer (km). These relatively small diameters make nanofiber yarns difficult to see and even more difficult to physically grasp and manipulate. Long nanofibers and nanofiber yarns further complicate manipulation given the additional material present in meters or kilometers of long nanofibers or yarns. Maintaining an orderly organization over a strand of nanofibers or nanofiber yarn of any length, and particularly long lengths, is vital: once tangled, nanofibers and nanofiber yarns are nearly impossible to untangle.

Other challenges exist regarding the manipulation of nanofibers and nanofiber yarns. For example, because of their very low density, nanofibers and nanofiber yarns (regardless of their total length) are easily moved by air currents as subtle as those produced by operation of an office ventilation system, the opening of a door of a room in which the nanofiber yarn is disposed, or the breath of a person as far as a meter away from the nanofiber yarn. Because many nanofiber yarns are more expensive per unit length than more traditional fiber yarns used in textile manufacturing (e.g., cotton, rayon, nylon, linen) and many materials used in cables for structural applications (e.g., steel wire and cable), there is a higher financial cost associated with waste (e.g., caused by tangling).

Despite these challenges, there remains great interest in using nanofibers and nanofiber yarns in products and manufacturing processes because of their compelling mechanical, chemical, thermal, and electrical properties. Furthermore, the more precision with which the nanofiber yarns are placed on a substrate and the smaller the minimum center to center distance between adjacent yarns on a substrate (referred to herein as "pitch"), the more technological applications nanofiber yarns can be applied to.

In light of this, embodiments of the present disclosure include techniques for placement of nanofibers and yarns comprised of nanofibers (both of which will be referred to as "nanofiber yarns" for brevity) having diameters in the tens of microns, less than five microns, or even less than one micron onto a substrate. In some embodiments, these nanofiber yarns (even those with diameters less than one micron) can be placed on a substrate at pitches less than 100 $\mu m$, less than 50 $\mu m$, less than 10 $\mu m$, and in some embodiments less than or equal to 2 $\mu m$.

In some embodiments, a high precision nanofiber yarn placement system includes a nanofiber yarn dispenser, a placement assembly, and an optional substrate on to which the nanofiber yarns are placed. The techniques for placement and embodiments of the placement system are all described below in more detail. Prior to describing these embodiments however, a description of carbon nanofibers, carbon nanofiber sheets, and carbon nanofiber yarns follows, embodiments of which are depicted in FIGS. 1 to 4B.

Properties of Carbon Nanofibers and Carbon Nanofiber Sheets

As used herein, the term "nanofiber" means a fiber having a diameter less than 1 $\mu m$. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be used to fabricate nanofiber sheets using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest").

The dimensions of carbon nanotubes can vary greatly depending on, for example, the number of walls and the production methods used. For example, the diameter of a carbon nanotube may be from 0.4 nm to 100 nm and its length may range from 10 $\mu m$ to greater than 55.5 cm. As a result, carbon nanotubes can have very high aspect ratios (ratio of length to diameter) with some as high as 132,000,000:1 or more. Given the wide range of dimensional possibilities, the properties of carbon nanotubes are highly adjustable, or tunable. While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

Nanofiber Forest

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces.

Example Methods for Producing Nanofiber Forests

Various methods can be used to produce nanofiber forests in accordance with the present disclosure. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. to 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers.

Figure 2:
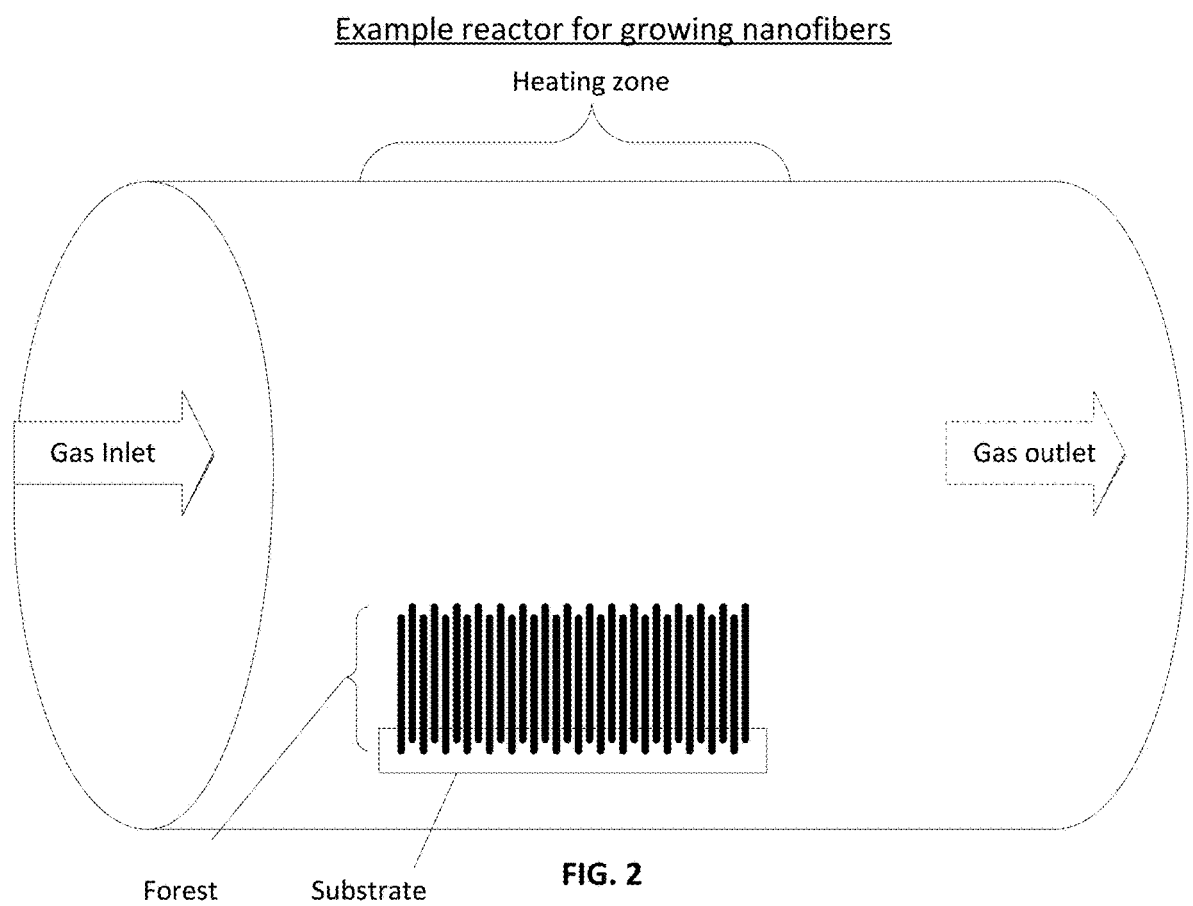
FIG. 2 is a schematic diagram of a reactor for growing nanofibers, in an embodiment.

A diagram of an example reactor for nanofiber growth is shown in FIG. 2. As can be seen in FIG. 2, the reactor may include a heating zone where a substrate can be positioned to facilitate nanofiber forest growth. The reactor also may include a gas inlet where fuel compound(s) and carrier gases may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream. Example methods of adding dopants during deposition of the nanofiber forest are described at paragraph 287 of PCT Publication No. WO 2007/015710, among other locations, and are incorporated by reference herein. Other example methods of doping or providing an additive to the forest include surface coating, dopant injection, or other deposition and/or in situ reactions (e.g., plasma-induced reactions, gas phase reaction, sputtering, chemical vapor deposition). Example additives include polymers (e.g., poly(vinyl alcohol), poly(phenylene tetrapthalamide) type resins, poly(p-phenylene benzobisoxazole), polyacrylonitrile, poly(styrene), poly(ether etherketone) and poly(vinyl pyrrodidone, or derivations and combinations thereof), gases of elements or compounds (e.g., fluorine), diamond, palladium and palladium alloys, among others.

The reaction conditions during nanofiber growth can be altered to adjust the properties of the resulting nanofiber forest. For example, particle size of the catalyst, reaction temperature, gas flow rate and/or the reaction time can be adjusted as needed to produce a nanofiber forest having the desired specifications. In some embodiments, the position of catalyst on the substrate is controlled to form a nanofiber forest having a desired pattern. For example, in some embodiments catalyst is deposited on the substrate in a pattern and the resulting forest grown from the patterned catalyst is similarly patterned. Exemplary catalysts include iron with a, buffer layer of silicon oxide ($SiO_2$) or aluminum oxide ($Al_2O_3$). These may be deposited on the substrate using chemical vapor deposition (CVD), pressure assisted chemical vapor deposition (PCVD), electron beam (eBeam) deposition, sputtering, atomic layer deposition (ALD), laser assisted CVD, plasma enhanced CVD, thermal evaporation, various electrochemical methods, among others.

After formation, the nanofiber forest may optionally be modified. For example, in some embodiments, the nanofiber forest may be exposed to a treatment agent such as an oxidizing or reducing agent. In some embodiments, the nanofibers of the forest may optionally be chemically functionalized by a treatment agent. Treatment agent may be introduced to the nanofiber forest by any suitable method, including but not limited to chemical vapor deposition (CVD) or any of the other techniques and additives/dopants presented above. In some embodiments, the nanofiber forest may be modified to form a patterned forest. Patterning of the forest may be accomplished, for example, by selectively removing nanofibers from the forest. Removal can be achieved through chemical or physical means.

Nanofiber Sheet

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 µm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

Figure 3:
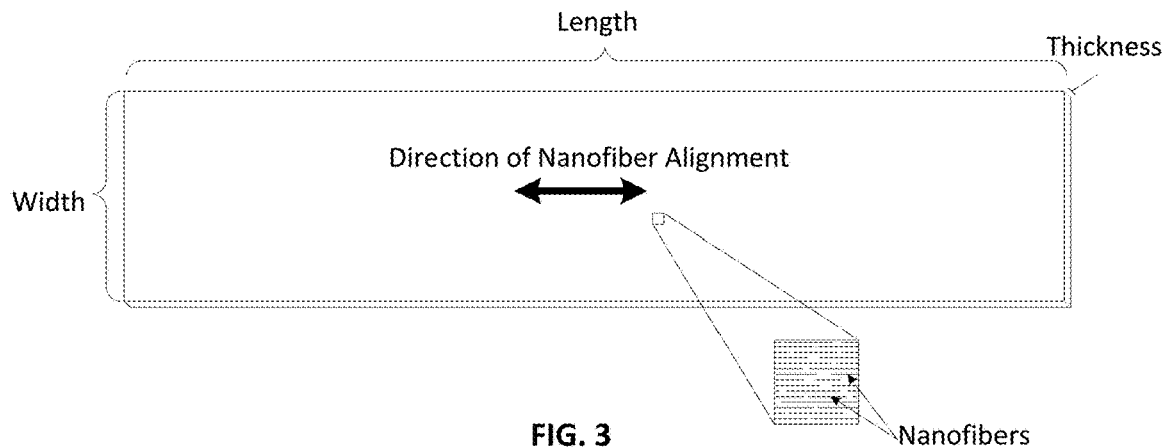
FIG. 3 is an illustration of a nanofiber sheet that identifies relative dimensions of the sheet and schematically illustrates nanofibers within the sheet aligned end-to-end in a plane parallel to a surface of the sheet, in an embodiment.

An illustration of an example nanofiber sheet is shown in FIG. 3 with relative dimensions illustrated. As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be stacked on top of one another to form a multi-layered sheet stack. Nanofiber sheets may be stacked to have the same direction of nanofiber alignment or to have different directions of nanofiber alignment. Any number of nanofiber sheets may be stacked on top of one another to form a multi-layered nanofiber sheet stack. For example, in some embodiments, a nanofiber sheet stack may include 2, 3, 4, 5, 10, or more individual nanofiber sheets. The direction of nanofiber alignment on adjoining sheets in a stack may differ by less than 1°, less than 5° or less than 10°. In other embodiments, the direction of nanofiber alignment on adjoining or interleaved sheets may differ by more than 40°, more than 45°, more than 60°, more than 80°, or more than 85°. In specific embodiments, the direction of nanofiber alignment on adjoining or interleaved sheets may be 90°. Multi-layer sheet stacks may include other materials such as polymers, metals and adhesives in between individual nonfiber sheets.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4A.

Figure 4A:
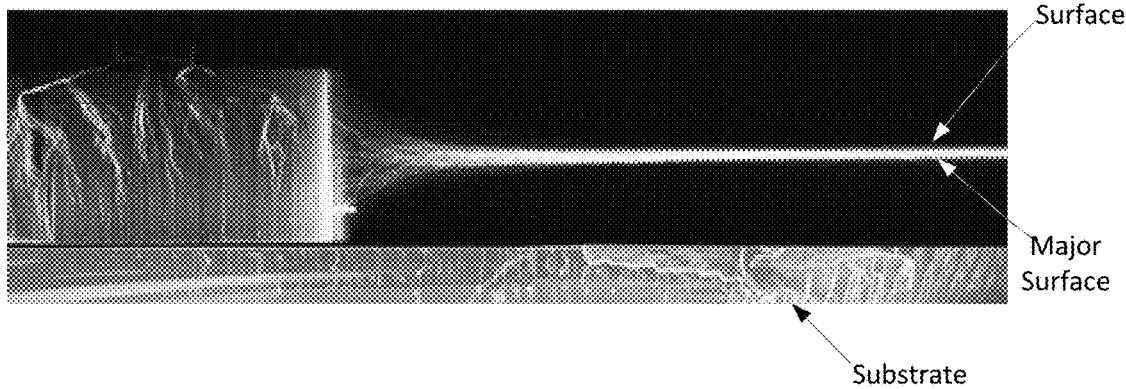
FIG. 4A is an image of a nanofiber sheet being laterally drawn from a nanofiber forest, the nanofibers aligning from end-to-end as schematically shown in FIG. 4, in an embodiment.
Figure 4B:
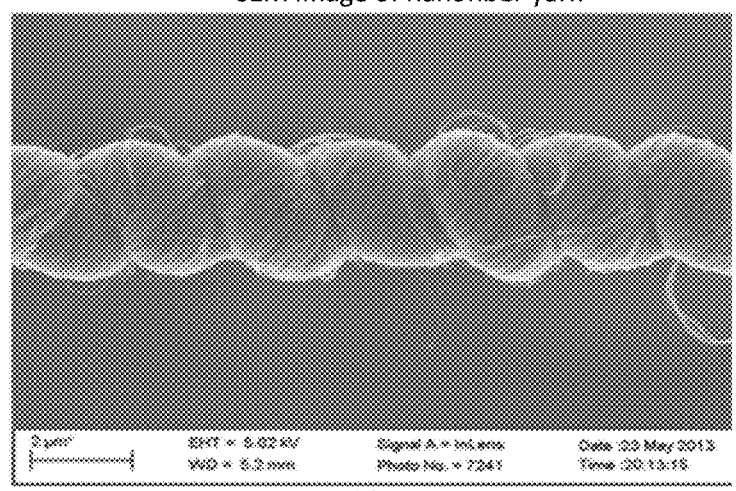
FIG. 4B is an image of a single ply nanofiber yarn that includes carbon nanofibers that have been twisted and coiled, in an embodiment.

As can be seen in FIG. 4A, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, prior to metallization and/or polymer infiltration, as disclosed herein may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Nanofiber Yarns

Nanofibers drawn from a forest can be spun into a single-ply yarn by "true-twist" techniques or "false-twist" techniques. In "true-twist" techniques, a first end of a collection of fibers is fixed and an opposing, second end of the fibers are twisted relative to the fixed first end. In a "false-twist" technique, twist is applied between the first ends and the second ends of a nanofiber collection. While not wishing to be bound by theory, it is believed that the compression and twisting applied to nanofibers in a false-twist technique causes the nanofibers to bond to one another via van der Waals forces, which helps maintain the applied twist. In one example, a false twist can be applied by passing a collection of nanofibers (e.g., a nanofiber sheet) over a rotating ring or band at an angle greater than 0° and less than 180° relative to the direction of rotation of the ring. In some examples, the ring or band is fabricated with a material having a coefficient of friction relative to the nanofiber strand sufficient to twist the nanofibers and with a surface energy low enough to resist accumulation of contaminants. In one embodiment, the ring or band is fabricated from silicone rubber. False twist spinning techniques of nanofiber yarns are described in International Application No. PCT/US2017/066665, which is incorporated by reference herein in its entirety. One example of a single-ply nanofiber yarn that has been twisted so as to include twisted nanofibers that are, in turn, coiled, appears in FIG. 4B.

In some embodiments, multiple single-ply nanofiber yarns, fabricated according to the techniques described above, can be plied together to form a multi-ply yarn. In these examples, two or more nanofiber yarns, including twisted nanofibers, coiled nanofibers, or both are plied together (e.g., through true-twisting, false-twisting, or some other plying technique). In some embodiments, nanofiber yarns (whether single ply, multi-ply, twisted, untwisted, coiled, and combinations thereof) can include nano or micro particles. Examples of these materials can include, but are not limited to, silver nanoparticles (including nanowires), graphene, and/or $TiO_2$. Furthermore, yarns can be infiltrated with any of a variety of polymers or oligomers (often using a solvent which is later removed) or other species that can be infiltrated into the yarn as a solution or suspension (the solvent/vehicle of which can be removed).

High Accuracy Nanofiber Yarn Application System

Figure 5A:
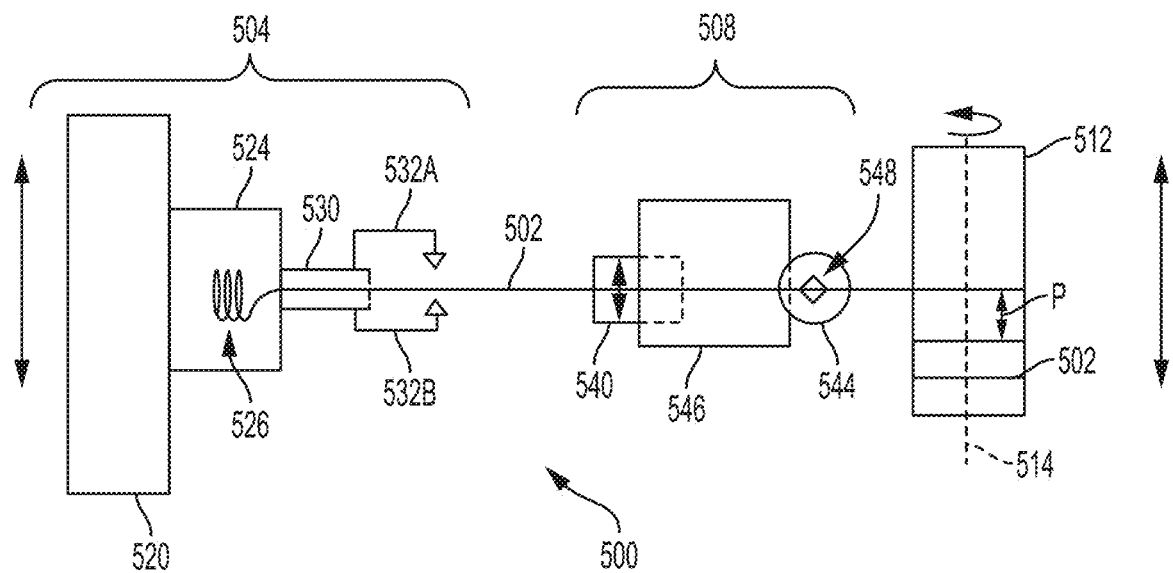
FIGS. 5A and 5B illustrate plan and elevational views, respectively, of a high accuracy nanofiber yarn application system, in an embodiment.
Figure 5B:
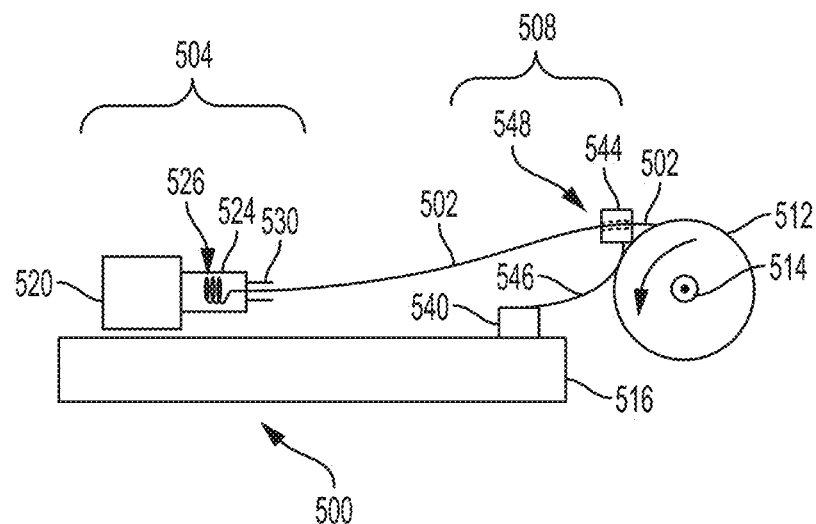

As indicated above, embodiments of a high accuracy nanofiber yarn application system are described herein. In some of these embodiments, the application system can manipulate nanofiber yarns having diameters less than 100 µm, less than 10 µm, less than 5 µm and even less than 1 µm in diameter by placing them on a substrate at pitches that are as low as approximately 2 µm (+/−10%). FIGS. 5A and 5B depict a plan view and a side view, respectively, of one embodiment of a nanofiber yarn application system 500. Concurrent reference to FIGS. 5A and 5B will facilitate explanation.

The application system 500 includes, at a high level, three subsystems. These three subsystems include the yarn dispenser assembly 504, a placement assembly 508, and a substrate 512. Each of these elements is described in turn below. Nanofiber yarn 502 runs throughout the systems depicted in FIGS. 5A and 5B, but is itself not considered an element of the system.

In the embodiment shown, the yarn dispenser assembly 504 includes a base 516 (shown in FIG. 5B only), a coarse adjustment translator 520 (also referred to as a "first translator" for convenience), a yarn dispenser 524, an optional conduit 530, and electrodes 532A and 532B (shown in FIG. 5A only).

The base 516 provides a structure on which the yarn dispenser assembly 504 and the placement assembly 508 can be connected. Examples of the base 516 and include a table, a workbench, or other similar structure.

The coarse adjustment translator 520, some elements of which are fixedly connected to the base 516, can include a screw-type or servo type mechanism that moves other elements of the yarn application system 500 (e.g., the yarn dispenser 524, optional conduit 530, electrodes 532A, 532B and/or the placement assembly 508, among others) back and forth in, for example, the directions indicated in FIG. 5A by the arrows associated with the coarse adjustment translator 520. It will be appreciated that other types of mechanisms may be used to move various elements of the application system 500 back and forth in the directions indicated. Regardless of the type of mechanism, the coarse adjustment translator 520 moves various other elements of the yarn dispenser assembly 504 and the placement assembly 508 on a distance scale of meters and/or centimeters over a time scale of tenths of seconds, milliseconds, or microseconds. This in turn, facilitates placement of the nanofiber yarn at a desired location and in a desired pattern on the substrate 512.

The yarn dispenser 524 of the yarn dispenser assembly 504 includes a spool 526 of nanofiber yarn 502. The yarn dispenser 524 enables the length of nanofiber yarn 502 wound around the spool 526 to be stored with a low risk of entanglement or damage while at the same time enabling controlled provision and application of the nanofiber yarn 502 to the substrate 512. In one example, the yarn dispenser 524 can be simple a cylindrical spool 526 around which the nanofiber yarn 502 is disposed. In another example, the yarn dispenser 524 includes a motor (or other analogous mechanism) that causes the cylindrical spool 526 to rotate, thus aiding provision of the nanofiber yarn 502 to the substrate 512. In one example, the nanofiber yarn 502 is dispensed at a rate of 0.5 meters (m)/minute (min) to 10 m/min. As described below, the rate at which the yarn is dispensed from the yarn dispenser 524 and the rate at which the yarn is attached (or adhered) to the substrate 512 can be selected so that a tensile force is applied to and maintained within the nanofiber yarn 502 of from 0.01 milliNewtons (mN) to 10 mN. In still another example, the yarn dispenser 524 includes a cylindrical spool (e.g., spool 526) that is disposed within a protective housing, as shown in FIGS. 5A and 5B. In still another embodiment, the yarn dispenser 524 can be that of depicted in FIG. 6, and described in PCT Application No. PCT/US2017/064122, which is incorporated herein by reference in its entirety. A detailed description of the yarn dispenser 524 follows in the context of FIG. 6.

In some embodiments, the nanofiber yarn 502 can pass from the yarn dispenser 524 into an optional conduit 530. The conduit 530 can be used to further protect and/or guide the nanofiber yarn 502 en route to other elements of system 500, described below. Examples of materials used for the conduit 530 include polyethylene tubing, polytetrafluroethylene (PTFE) tubing, stainless steel tubing, among others.

The system 500 can, in some embodiments, include a non-contact nanofiber yarn cutting system that includes two electrodes 532A and 532B. The electrodes 532A and 532B can be used to cut the nanofiber yarn 502 into yarn segments. This enables discontinuous yarn segments to be applied to the substrate 512, and, with the operation of other elements of system 500, applied in various configurations, including but not limited linear segments that can be orthogonally and diagonally oriented to one another, a closed form shape (e.g., a square or circle), and a spiral. In additional embodiments, yarn segments may be laid across previously deposited yarn segments. Two, three, four or more layers of yarn segments can be deposited. In one embodiment, additional segments may be deposited at about 90° to the existing segments to provide a cross hatched pattern. In some cases, yarn segments can be cut at the junction of the underlying yarn to avoid contact with previously deposited segments. In these embodiments, one group of yarn segments may be continuous and another group may be discontinuous. In other cases, where contact is desirable, the yarn can be deposited directly and continuously over the previous applied layers.

The electrodes can use any of a variety of technologies. For example, two electrodes 532A and 532B can be connected to a power source so as to form an electrical arc that, when spanning the distance between the electrodes 532A and 532B, removes material from the nanofiber yarn 502. It will be appreciated that other types of non-contact cutting techniques can be used. For example, a single electrode (e.g., 532A) can be used to form an electrical arc between the single electrode and the nanofiber yarn 502 that cuts the nanofiber yarn. In another embodiment, one or more electrodes can be configured to produce coronas that cut or otherwise sever the nanofiber yarn 502. The one or more electrodes are then connected to an electrical power source and controller, including but not limited to a power supply and controller of an electrical discharge machining apparatus (EDC), an arc welder, a plasma cutter (which may also include a plasma gas source), and other similar devices. It will also be appreciated that the electrodes can be in a fixed position relative to the nanofiber yarn 502 or can be moved relative to the nanofiber yarn 502 so as to encourage or discourage electrical arcing.

In an alternative embodiment, a laser system can be used to cut the nanofiber yarn 502. In this alternative, a laser is focused at a point on the nanofiber yarn 502 that cuts or severs the yarn into segments, as described above.

In still other embodiments, contact cutting systems can be used. In one example, a high-temperature electrical resistor or other source of thermal energy can also be used to cut the nanofiber yarn 502 when the resistor is brought close to and optionally in contact with the nanofiber yarn. Various other guillotine type or scissor type blade arrangements can be used in other embodiments.

In the embodiment shown, placement assembly 508 includes a fine adjustment translator 540, a compliant flange 546, and a guide 544. The placement assembly 508 can be used to position nanofiber yarns on a substrate accurately (i.e., within a few microns or tenths of a micron of a target location) regardless of the diameter of the nanofiber yarn and at pitches that are as low as 2 μm or lower.

In one embodiment, the fine adjustment translator 540 is attached to the coarse adjustment translator 520 (not shown) and also attached to the compliant flange 546. The fine adjustment translator 540 can control the lateral location (i.e., parallel to a reference axis 514 of the substrate 512 and in the direction(s) shown by the arrows)) at which the nanofiber yarn 502 is placed on the substrate 512 on a distance scale of millimeters, micrometers, or tenths of micrometers over a time scale as small as milliseconds or microseconds. In one example, fine adjustment translator 540 can include a piezoelectric actuator that can apply small displacements (on the order of microns, tenths of microns, or hundredths of microns) that in turn causes corresponding displacements (e.g., from 0.05 microns to 5 millimeters) in the compliant flange 546 and guide 544. In another embodiment, an electromagnetic actuator is used for the fine adjustment translator 540 instead of a piezoelectric actuator. Regardless, in one embodiment, the fine adjustment translator 540 can make translations on a frequency of kilohertz and thus can cause frequent and dimensionally fine changes in the direction of the guide 544 and thus control the placement of the nanofiber yarn 502 on the substrate 512 in correspondingly small dimensional increments.

The compliant flange 546 connects the guide 544 and the fine adjustment translator 540 together. The compliant flange 546 has a low modulus of elasticity and/or flexural modulus of elasticity (e.g., less than 5 GPa), such as that exhibited by polytetrafluoroethylene (PTFE), nylon, or other thermoplastic materials. In examples, the compliant flange 546 is less than 2 mm thick.

As shown, a first side of the compliant flange 546 is attached to the fine adjustment translator 540, a second side of the compliant flange 546 opposite the first side can, in some embodiments, rest against the substrate 512 (the guide 544 being attached to a surface of the compliant flange 546 between the first side and the second side). This is shown in FIG. 5B (among other figures). FIG. 5A shows a separation between the compliant flange 546 and the substrate 512 as an alternative configuration of the system 500 and for clarity of depiction in the plan view.

Regardless, when resting against the substrate 512 (on a cylinder, for example), the elasticity of the compliant flange 546, which in this example is compressed between the fine adjustment translator 540 and the substrate 512, provides an urging force that maintains the position of the guide 544 relative to an exterior surface of the substrate 512. Topography associated with the exterior surface of the substrate 512 can cause the compliant flange 546 to further compress (i.e., in response to a compressive force applied to the compliant flange 546 by a salient feature on the substrate 512) or relax (i.e., in response to a reverse salient feature on or within the surface of the substrate 512). This flexibility of the compliant flange 546 and the associated flexing and relaxing in response to the topography of the exterior surface of the substrate 512 enables the guide 544 as a whole to maintain an approximately (e.g., within 0.5 cm, 1 mm, or less) constant distance (which itself can be within 1 cm, 1 mm, or less) relative to the exterior surface of the substrate 512. Thus, the guide 544 can be proximate to the substrate without contacting the substrate. This in turn improves the accuracy with which the nanofiber yarn 502 is applied to the substrate, and thus helps achieve the accuracy in yarn placement and the fine pitch between adjacent nanofiber yarns described above. The resiliency of the compliant flange 546 also prevents contact between the substrate 512 and the guide 544. This separation (that is maintained at an approximately uniform distance) also helps preserve the accuracy of placement and fine pitch between adjacent segments of nanofiber yarn 502 on the substrate 512.

The guide 544 defines a channel 548 defined by the guide 544 through which the nanofiber yarn 502 passes prior to being placed on the substrate 512. The features and benefits of the guide 544, the channel 548 are described below in more detail in the context of FIGS. 7-10.

The substrate 512 shown in FIGS. 5A and 5B is a cylindrical substrate, the rotation of which is indicated by curved arrows in FIGS. 5A and 5B. It will be appreciated however, that the embodiments described herein are applicable to any shape, geometry or configuration of the substrate, even those for which variations in surface topography or shape may present difficulties in accurately and precisely placing nanofiber yarns. The substrate 512 can be used to secure a leading end of the nanofiber yarn 502, thus enabling movement of the substrate 512 (whether rotational or planar translation) to draw additional portions of the nanofiber yarn 502 from a dispenser. In examples, the substrate 512 can secure the leading edge of the nanofiber yarn 502 by using any of the following as a component of the substrate: an adhesive film (including ultra-violet light curable adhesives); a thermoplastic polymer at or above the glass transition temperature and/or a temperature at which the polymer is tacky so as to adhere to the nanofiber yarn; a magnetic field encompassing the substrate 512 that can draw a nanofiber yarn infiltrated with magnetic particles having an opposite magnetic polarity to that of the substrate 512. In other examples, van der Waals forces, vacuum, electrostatic forces, mechanical adhesion (e.g., based on surface roughness or entangling features such as those found in hook-and-loop fasteners) or complementary chemical adhesion from the reaction between one component on the substrate and a complementary reactive component on or within the nanofiber yarn can all be used to connect the leading edge (or any other portion) of the nanofiber yarn 502 to the substrate 512. In still another embodiment, the nanofiber yarn 502 can be infiltrated with an adhesive or coating with an adhesive that attaches to the substrate 512 (whether or not the substrate 512 itself includes an adhesive). In yet still another embodiment, the nanofiber yarn 502 can be infiltrated with a first precursor that reacts upon contact with a second precursor disposed on the substrate 512, thus joining the yarn 502 and the substrate 512 together.

In some cases, one or more removable surfaces (using any one or more of the preceding connection techniques) can form an exterior surface of the substrate 512. Upon applying, adhering, or otherwise connecting a nanofiber yarn 502 to the one or more removable surfaces on the substrate 512, the removable surface can be removed from the substrate 512, thus enabling convenient application of the yarn to another surface, packaging of the removable surface and the attached yarn so as to be shipped, or other use.

Embodiments described above can overcome various sources of variation normally present during placement of nanofiber yarns on a substrate when using more traditional techniques and systems. For example, in this example depicted in FIGS. 5A and 5B, it will be appreciated that (as suggested above), the cross-section of the cylindrical substrate 512 may not be perfectly circular which can affect the uniformity, consistency, and precision with which a nanofiber yarn 502 is placed on the substrate 512.

The embodiments described herein, including but not limited to those depicted in FIGS. 5A and 5B, can be applied to overcome irregularities in the shape of the substrate, the topography of the substrate, and/or the tolerances associated with relative movement between the substrate and the structures used to provide the nanofiber yarn to the substrate.

Yarn Dispenser

Figure 6:
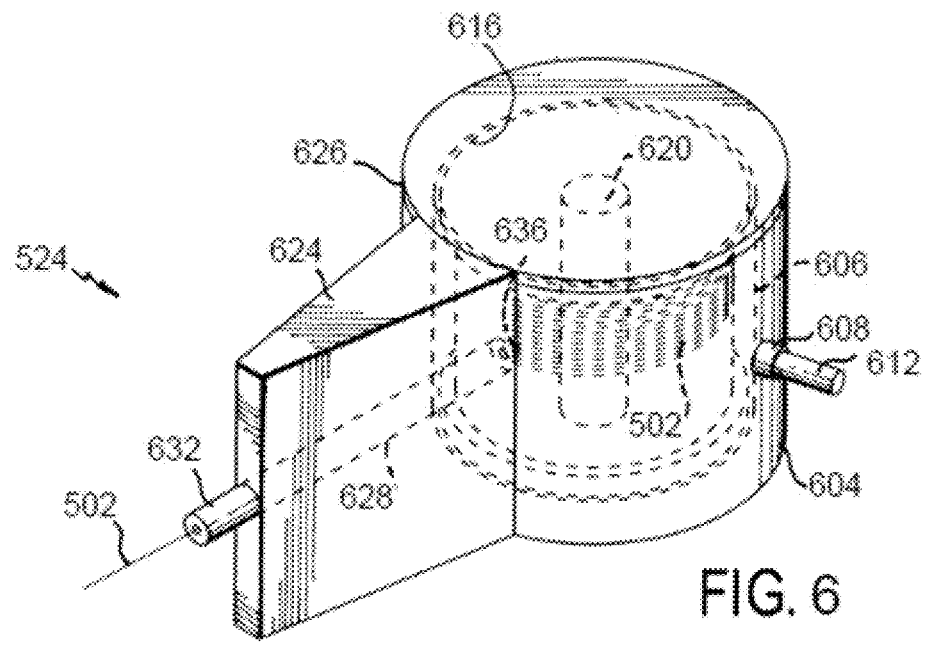
FIG. 6 is an illustration of a yarn dispenser used in some embodiments of the nanofiber yarn application system depicted in FIGS. 5A and 5B, in an embodiment.

FIG. 6 illustrates a perspective view of one example of a nanofiber yarn dispenser 524 that be integrated into the system 500. The nanofiber yarn dispenser 524 is configured to securely store and dispense nanofiber yarns in a way that improves the convenience of manipulation of the nanofiber yarn while reducing the probabilities of nanofiber yarn waste and contamination.

The example dispenser 524 shown in FIG. 6 includes a housing 604, an inlet 608, a gas source 612, a spool 616, an axle 620, a nozzle 624, a liner 632, and an outlet 636.

The housing 604 is configured to securely store and dispense nanofiber yarns by defining a chamber 606 within the housing 604 that is used to contain a spool of nanofiber yarn. The nanofiber yarn is protected from contamination by the housing and is dispensed through an outlet defined by the housing, as described below in more detail.

In one embodiment, the housing 604 is hermetically sealed (other than for the inlet 608 and an outlet 636 defined by the housing 604 and described below in more detail) so as to prevent unintentional ingress or infiltration of fluids (e.g., water, air) and contaminants. In some examples, the housing 604 is also sealed in a way that prevents unintentional egress of a fluid (whether gas, gel, polymer, swelled polymer, polymer solution, adhesive, adhesive polymer, or other fluid) stored within the chamber 606 from exiting the housing 604. Regardless of the purpose, the formation of a hermetically sealed housing 604 can be accomplished using any number of techniques including forming the housing 604 from a single piece of material via injection molding or additive manufacturing (also known as "3D printing"), sealing seams between adjoining portions of the housing 604 using an adhesive (e.g., siloxane polymer), or welding portions of the housing 604 together to seal the seams.

In one example, the housing 604 can be configured to include an access cover 626 that is large enough to allow a spool 616 of nanofiber yarn to be inserted, removed, and/or replaced within the housing 604. The access cover 626 can be hermetically sealed to the housing 604 using, for example, a sealant such as silicone grease or a compressible gasket (e.g., a neoprene or silicone rubber gasket). The access cover 626 can be secured using a clamp, threaded bolts or screws, or other mechanism to apply and maintain pressure between the housing, the compressible gasket (not shown), and the access cover 626. The seal may be permanent or temporary. As used herein, a seal is permanent if it cannot be readily unsealed without damage to the housing or cover.

Another advantage of a sealed housing 604 as described above includes the use of negative pressure (i.e., a vacuum) to locate a free end of a nanofiber yarn. For example, a spool having a free end of nanofiber yarn can be placed within a sealed housing 604. A vacuum can be applied at outlet 636 of the housing 604, which draws the free end of the nanofiber yarn from the chamber 606 as the vacuum removes any gaseous contents of the chamber 606. This process may also include allowing gas or fluid to flow through the inlet 608 and/or the gas source 612, into the chamber 606 and through the outlet 636, thus carrying the free end of the nanofiber yarn from the chamber 606 and through the outlet 636. Regardless, locating the free end of a nanofiber yarn using a vacuum and the flow of a fluid (liquid or gas) is helpful in manipulating nanofiber yarns because the free end of the nanofiber yarn can be located quickly, and without difficult manual inspection and/or manual manipulation. Once located, the free end of the nanofiber yarn can be engaged with machinery, applied to a surface, or otherwise act as a starting point for the controlled application of the nanofiber yarn using the dispenser 600.

The inlet 608 defined by the housing 604 is a passage through which fluid can flow. As indicated above, the inlet 608 can be used to provide a positive pressure and flow to the chamber 606 defined by the housing 604 that is used to move a free end of a nanofiber yarn through an outlet 636 of the dispenser 600.

The inlet 608 can also be used to provide other types of gasses or fluids to the housing 604 and within which a spool 616 of nanofiber yarn is disposed. For example, an inert gas (e.g., argon, nitrogen) can be introduced via the inlet 608. This may be done if, for example, a second material has been incorporated into the nanofiber yarn (e.g., metallic nanoparticles) that is susceptible to corrosion, degradation, or contamination from components in air (e.g., oxygen, water vapor, dust particles).

The gas source 612, which is optional, is in fluid communication with the inlet 608. As illustrated, gas source 612 is a tube that is connected to a portion of the housing 604 that is proximate to the inlet 608 (and sealed) so as to be integral with the housing 604. In this way, the gas source 612 enables a gas (or other fluid) to be provided to the chamber 606 through the inlet 608, while at the same time preventing infiltration of contaminants into the chamber 606.

The spool 616 is configured so that a length of nanofiber yarn 614 may be wound around it and, once wound, disposed within the dispenser 600. The spool 616 is also configured to rotate while disposed within the chamber 606 defined by the housing 604 in response to the free end of the nanofiber yarn 614 being pulled from the dispenser 600.

In one example, the axle 620, which is optional, is a cylindrical structure disposed at a center of a circular cross-section of the spool 616 that reduces contact-induced friction between the spool 616 and the housing 604. Axle 620 can be passive, meaning that it is stationary with respect to rotation of the spool, or it can be active, meaning that it rotates to facilitate rotation of the spool. The benefits of including the optional axle 620 include centering the spool in the housing, increasing the speed of rotation for a given unit of applied force and/or reducing a force needed to withdraw nanofiber yarn 614 from the spool 616. Another benefit of the axle 620 is that it reduces surface area to which lubricant is applied, thus reducing the amount of lubricant introduced into the chamber 606 defined by the housing 604 and thus reducing the likelihood of contamination of the nanofiber yarn by lubricant.

The nozzle 624 is attached to the housing 604 or otherwise integral with the housing 604. The optional nozzle 624 is shown in the embodiment of FIG. 6 to illustrate some of the advantages of including the nozzle 624 rather than dispensing the nanofiber yarn directly from the outlet 636 in the housing 604.

The nozzle 624 defines a channel 628 that is in communication with the outlet 636 defined by the housing 604. The channel 628 has a diameter that is large enough to contain a portion of the elongated nanofiber yarn as it is being unwound from the spool 616, but small enough to prevent the flexible and compliant nanofiber yarn from being pushed back into chamber 606. In some examples, an inside diameter of the channel 628 is 10%, 15%, 25%, 50%, 100%, 250%, or values therebetween larger than an outside diameter of a nanofiber yarn used therein to accomplish this feature. The channel 628 also can have an opening (i.e., an inner diameter of the opening) opposite that of the outlet 636 that is small enough to prevent infiltration of water. That is, the opening of the channel can be small enough so that the surface tension of water prevents water droplets from wetting the interior surface of the channel 628. One example of a relationship used to calculate the radius of the channel that can prevent water infiltration follows in Equation 1.

$$r = 2\gamma/\Delta P \qquad \text{Equation 1}$$

where $r$ is the radius of the opening that prevents water infiltration, $\gamma$ is surface tension of the water, and $\Delta P$ is the difference in pressure between the interior of a droplet and an exterior surface of the droplet. In some examples, $\Delta P$ is proportional to the acceleration due to gravity (9.81 meters/ second) and the density of water (approximately 1000 kg/m$^3$ at 1 atmosphere of pressure and "standard" temperature (i.e., 0° C.). In some examples, a surface tension of water (or other liquid material) on a surface of the nozzle 624 can affect infiltration of water into the channel defined by the nozzle 624. For example, low surface energy materials such as silicone and polytetrafluoroethylene, as well as other materials having a similarly low surface energy and/or similarly hydrophobic will help prevent infiltration of water.

Including the channel 628 also facilitates flow of gas provided through the inlet 608 that can be used to locate a free end of nanofiber yarn disposed within the chamber 606 and "thread" the yarn out of the outlet 636 and through the channel 628 for subsequent use.

The optional liner 632 is configured to fit within the channel 628. The liner 632 provides an alternative surface within which a nanofiber yarn may exit the dispenser 600. The liner 632 may be removable so as to be conveniently replaced. For example, the channel 628 defined by the nozzle 624 may be dimensioned to have a size much greater than that desired for most nanofiber yarns. In one example, a liner 632 has an outside diameter sufficiently large to form an interference fit with an interior surface of the channel 628 and has an interior (or inner) diameter sufficiently small to provide a channel for a nanofiber yarn that reduces the risk of tangling of the nanofiber yarn and/or prevents infiltration of water, as described above. Different liners 632 having different interior diameters can be subsequently inserted into the channel 628 to correspond to different diameter nanofiber yarns. Generally, the diameter of a liner 632 (or of the channel 628 if the liner 632 is not used in the dispenser 600) can be at least 50% larger than the diameter of a nanofiber yarn sought to be dispensed through the liner 632 from the dispenser 600. In other examples, the diameter of the liner 632 (or the channel 628) is 70% to 100% larger, or from 100% to 200% larger than the diameter of a nanofiber yarn sought to be dispensed through the liner 632 from the dispenser 600. In one example a 30 µm diameter nanofiber yarn can be dispensed through a 50 µm diameter liner. In another example a 100 µm diameter nanofiber can be dispensed through a 200 µm diameter liner. It will be appreciated that the diameters of the channel 628 and the liner 632 can be selected in coordination for embodiments in which both are used.

Another advantage of the liner 632 is that it provides an easily replaced surface through which a nanofiber yarn can be dispensed. This is particularly helpful for embodiments of the dispenser 600 that have a polymer, air-activated adhesive (e.g., methacrylate-based adhesives), other adhesive (e.g., a pressure sensitive adhesive, an epoxy, an elastomeric adhesive, sol gel precursors), and/or high surface area graphene flakes, graphene oxide, or other filler particles disposed within the adhesive that improve adhesion to a substrate or between overlapping yarns, solvent, or other fluid component disposed within the chamber that can also occupy, and potentially occlude, the channel 628. When using the liner 632, any occlusion can be removed by simply removing the occluded liner 632, replacing it with a clean liner 632, and re-threading the nanofiber yarn in the clean liner 632 using techniques described above.

The outlet 636, as described above, is defined by the housing 604 and provides an opening through which a nanofiber yarn can pass when being dispensed from the dispenser 600. The outlet 636 can be in communication with one or more of the channel 628 and the liner 632, as described above.

Placement Assembly

Figure 7:
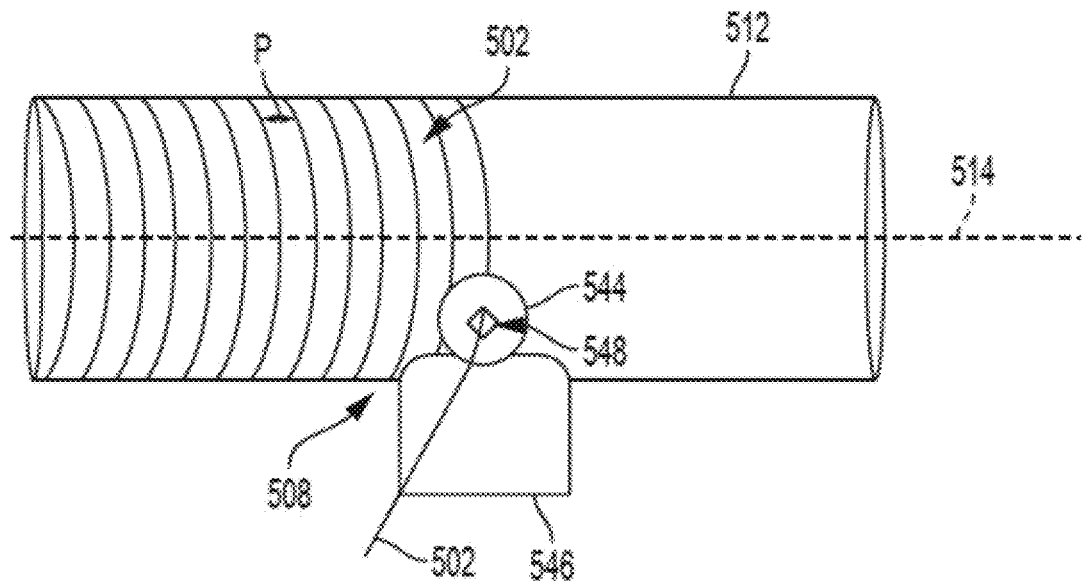
FIG. 7 is an elevational view of a placement assembly of a nanofiber yarn application system, in an embodiment.

FIG. 7 illustrates an elevational view of the placement assembly 508 in the process of providing nanofiber yarn 502 to the substrate 512. As indicated above, along with other elements of the system 500, the placement assembly 508 can place a plurality of nanofiber yarns 502 on the substrate 512 at a pitch of less than 100 µm, less than 50 µm, less than 10 µm, and in some embodiments as low as 2 µm. As also indicated above, the placement assembly 508 can accomplish these fine pitches for nanofiber yarns having diameters that are as small as 1 µm or less.

As shown in FIG. 7, the compliant flange 546 of the placement assembly 508 is in contact with the substrate 512 (in this example a rotating cylinder) so as to maintain an approximately (e.g., within 1 mm) separation between the guide 544 and the substrate 512. The nanofiber yarn 502 passes through the channel 548 defined by the guide 544. Once through the channel 548, the nanofiber yarn 502 is placed on the substrate 512 at a pitch "P" having any of the minimum values (or greater) indicated above.

Figure 8:
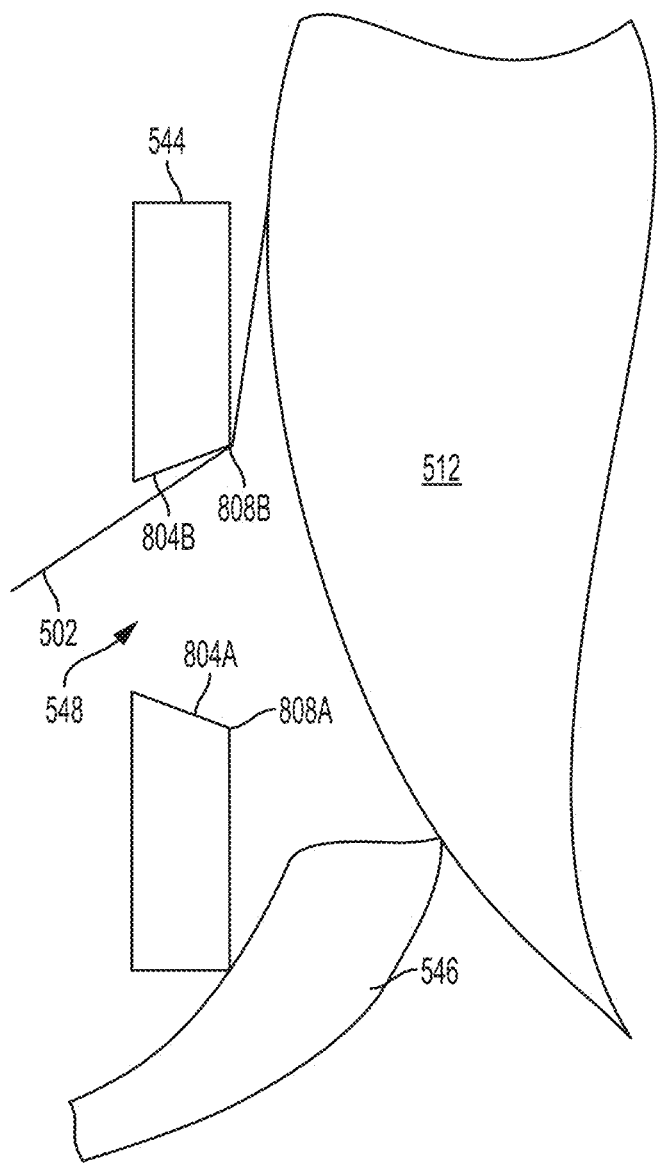
FIG. 8 is a side view of the placement assembly shown in FIG. 7, in an embodiment.

FIG. 8 illustrates a cross-sectional view (taken perpendicular to the reference axis 514) of the configuration depicted in FIG. 7. As shown (and previously described), the compliant flange 546 makes contact with the substrate 512 (in this example a cylindrical substrate, a portion of which is shown), thus maintaining a distance between the guide 544 and the substrate 512 that remains constant regardless of variations in the topography of the substrate 512, as described above. As shown, the guide 544 defines a channel 548 through which nanofiber yarn 502 passes prior to its application to the surface of the substrate 512. More specifically, the guide 544 includes interior surfaces 804 (804A and 804B in this cross-sectional view) that in turn define one or more corners 808 (in this example 808A and 808B) occurring at, in this example a junction of two interior surfaces 804. In some examples, a corner 808 (through which the nanofiber yarn 502 passes) is formed by the junction of two interior surfaces 804 at an angle of from 30° to 90°. In some examples, this angle is measured on surfaces 804 adjacent to the corner 808 at a macroscopic distance 0.1 mm or 0.2 mm from the corner 808. The angle is not limited to this range of angles, but rather is selected in response to a diameter of the nanofiber yarn 502 and also selected to be obtuse enough so that the corner 808 does not inhibit movement of the yarn 502 through the guide but also acute enough so that the nanofiber yarn 502 remains at the corner and thus does not have unintentional variation in position relative to the substrate 512. It will be appreciated that the term "corner" is used out of convenience to refer to a location at which the yarn 502 will move to and stay within during use of embodiments described herein and is not intended impose a narrow geometric interpretation (for example, an atomic scale 90° angle).

The guide 544 is oriented so that the nanofiber yarn 502 naturally moves to and passes through a corner 808 when the nanofiber yarn 502 is under tension. Tension in the nanofiber yarn 502 occurs naturally during application of the nanofiber yarn 502 onto the surface of the substrate 512. The nanofiber yarn 502 is released from the dispenser 524 at a first controlled rate and similarly applied to the substrate 512 at a second controlled rate. The first and second controlled rates are controlled (whether through movement of one or more of the coarse adjustment translator 520, the fine adjustment translator 528, and the substrate 512 itself) so as to impart a tensile force on the nanofiber yarn 502 of from 0.1 milliNewtons (mN) to 10 mN. Regardless, the tensile force on the nanofiber yarn 502 will naturally draw the yarn to a top-most corner within the channel 548 defined by the guide 544. It will be appreciated that the configuration of the channel 548 and the corners 808 described herein are selected for convenience of explanation only. It will be appreciated that any of a variety of configurations will produce a similar effect (e.g., an oval-shaped channel, a tear-drop shaped channel, a circular channel having a diameter small enough to similarly minimize movement of the yarn 502, e.g., micron-scale diameter).

Disposing the nanofiber yarn 502 at a corner 808 has a number of benefits that improve the consistence, accuracy, and precision with which the nanofiber yarn 502 is placed, and facilitate the yarn pitches already described above. One benefit is that the nanofiber yarn 502, once disposed at a corner 808, is likely to remain in the corner 808 regardless of lateral forces applied to a portion of the yarn between the corresponding guide (e.g., due to lateral movement of the substrate 512 and/or the coarse and fine adjustment translators due to the physical geometric constraints placed on the nanofiber yarn 502 by the adjacent (and possibly impinging) interior surfaces. This firm placement of the nanofiber yarn 502 in the corner 808 reduces variability in the placement of the nanofiber yarn 502, as described above, because the nanofiber yarn is less likely to move relative to the substrate in response to any unintentionally applied forces. That is, the configuration of the corner 808 is such that the adjacent interior surfaces of the channel provide resistance to lateral translations of the yarn 502, thus keeping the yarn 502 in place.

Figure 9A:
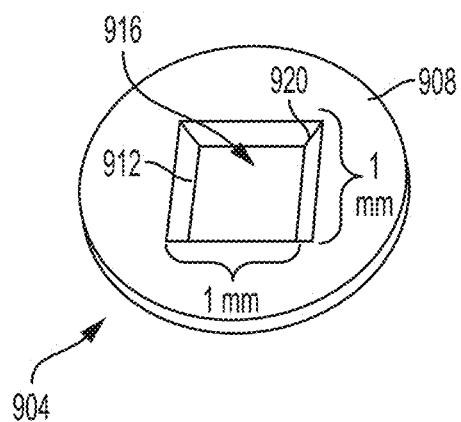
FIGS. 9A, 9B, and 9C illustrate various configurations of guides used in a placement assembly of a yarn application system, in embodiments.
Figure 9B:
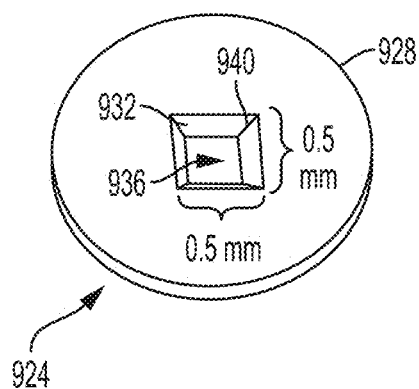
Figure 9C:
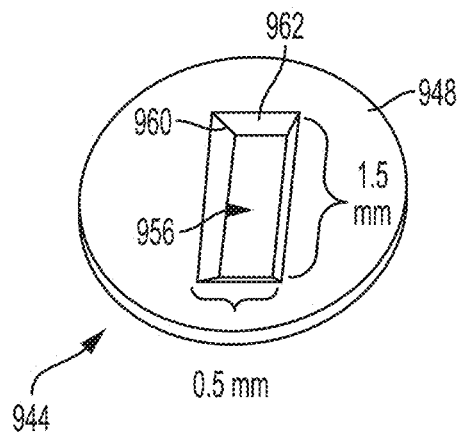

FIGS. 9A, 9B, and 9C illustrate various embodiments of guides. FIG. 9A illustrates a guide 904 fabricated from a disk 908 that includes, in this case, four interior surfaces 912 (only one of which is labeled for clarity) that define channel 916. In this example, the disk 908 has a diameter of 3 mm and a thickness of 200 μm. The interior surfaces 912 each have a length of 3 mm. As described above, the interior surfaces 912 intersect one another at corners 920 (only one of which is labeled for clarity). It will be appreciated that the dimensions for the guide 904 are for illustration only and that many different guide dimensions, geometries, and configurations are consistent with the concepts disclosed herein.

FIG. 9B illustrates a guide 924 fabricated from a disk 928 that includes interior surfaces 932 (only one of which is labeled for clarity) that define channel 936. In this example, the disk 928 has a diameter of 3 mm and a thickness of 200 μm. The interior surfaces 932 each have a length of 0.5 mm. As described above, the interior surfaces 932 intersect one another at corners 940 (only one of which is labeled for clarity). It will be appreciated that the dimensions for the guide 924 are for illustration only and that many different guide dimensions, geometries, and configurations are consistent with the concepts disclosed herein.

FIG. 9C illustrates a guide 944 fabricated from a disk 948 that includes interior surfaces 962 (only one of which is labeled for clarity) that define channel 956. In this example, the disk 948 has a diameter of 3 mm and a thickness of 200 μm. The two interior surfaces 962 have a length of 0.5 mm and two interior surfaces 962 have a length of 1.5 mm as indicated in FIG. 9C to form a rectangle. As described above, the interior surfaces 962 intersect one another at corners 960 (only one of which is labeled for clarity). It will be appreciated that the dimensions for the guide 944 are for illustration only and that many different guide dimensions, geometries, and configurations are consistent with the concepts disclosed herein.

Any of the preceding guides can be fabricated from a single crystal of silicon or germanium. Single crystals of these materials can be selectively etched using an etchant chemical that removes only some crystallographic planes of the crystal and not others, thus facilitating formation of the channel and corresponding interior surfaces. In other embodiments, any of the preceding embodiments of guides can be fabricated from quartz, ceramics such as zirconium oxide, aluminum oxide, titanium oxide), metals, such as steel, stainless steel, tungsten, copper, among others. In some cases, the guide may be made of a material to impart characteristics to the yarn passing over it. For example, it may comprise a material that applies a static charge to the yarn, allowing it to adhere to the substrate.

While embodiments described above, for example, the embodiment of the system 500, show only a single guide and nanofiber yarn being applied to a single substrate, it will be appreciated than a system can be configured in which multiple yarns are provided through one or more guides and placed on one or more substrates simultaneously.

Figure 10:
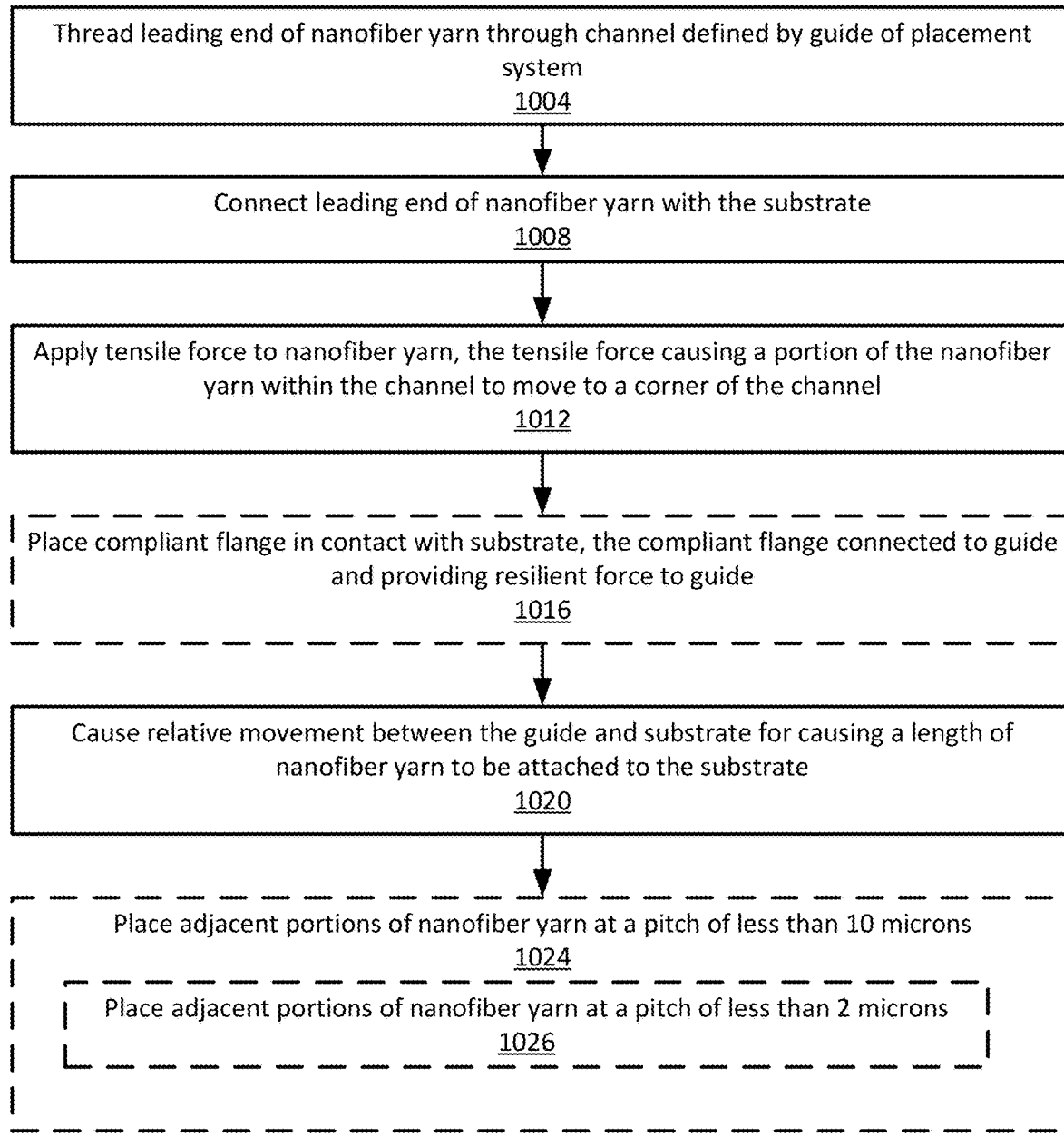
FIG. 10 is a method flow diagram illustrating an example method for using a yarn application system, in an embodiment.

FIG. 10 illustrates an example method 1000 for applying nanofiber yarns according to some of the embodiments described above. The method 1000 begins by threading 1004 a leading end of a nanofiber yarn through a guide defining a channel, the guide proximate to a substrate. The leading end of the nanofiber yarn is connected 1008 with the substrate. A tensile force is then applied 1012 to the nanofiber yarn. The tensile force causes a portion of the nanofiber yarn disposed within the channel to move to a corner of the channel, the corner limiting movement of the nanofiber yarn within the channel in response to the applied tensile force on the nanofiber yarn. As described above, the tensile force can be between 0.1 mN to 10 mN. In some examples, applying the tensile force comprises rotating a cylindrical substrate so as to draw the nanofiber yarn through the channel at a first rate that is different from a second rate at which the nanofiber yarn is provided. This difference between the first rate and the second rate can cause the tensile force.

In some embodiments, the method 1000 further includes optionally placing 1010 a compliant flange in contact with the substrate and attached to the guide. As described above, the compliant flange provides a resilient force for maintaining a uniform distance between the guide and the substrate during relative movement between the guide and substrate.

The method 1000 includes causing 1020 relative movement between the guide and the substrate. As this relative movement occurs, it can cause a length of nanofiber yarn to be attached to the substrate at different locations corresponding to the relative movement. The relative movement can be caused by a translation of the guide (e.g., through the systems described above), rotation or translation of the substrate, or both. In some cases, adjacent portions of the nanofiber yarn are placed 1024 at a pitch of less than 10 μm and optionally less than approximately 2 μm, as described above.

Applications

Embodiments described above are particularly useful for applying precisely placed carbon nanotube (or equivalently nanofiber) yarns on a substrate for a variety of applications. For example, a pattern (of parallel yarns and/or an orthogonal grid) of yarns can be placed on a substrate, the pattern of yarns then acting as a polarizer or a shield for electromagnetic radiation (EMI) including radio frequency (RF) radiation. Nanofiber yarns can also be arranged to function as a resistive heater when configured and/or infiltrated with materials that provide a corresponding electrical resistance for the nanofiber yarns. Nanofiber yarns can also be tailored to have a very low electrical conductivity (e.g., equal to or lower than that exhibited by copper, aluminum, and/or gold) and used as electrical connections between electronic components.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for applying a nanofiber yarn to a substrate, the method comprising:
    threading a leading end of the nanofiber yarn through a guide defining a channel, the guide proximate to the substrate;
    connecting the leading end of the nanofiber yarn with the substrate;
    applying a tensile force to the nanofiber yarn, the tensile force causing a portion of the nanofiber yarn to come into compliance with an edge of the guide, the channel limiting movement of the nanofiber yarn in response to the applied tensile force on the nanofiber yarn;
    applying a first portion of the nanofiber yarn to the substrate; and
    applying a second portion of the nanofiber yarn to the substrate proximate to the first portion of the nanofiber yarn at a pitch of less than 10 microns.

2. The method of claim 1, wherein the tensile force is from 0.1 milliNewtons (mN) to 10 mN.

3. The method of claim 1, wherein applying the tensile force comprises rotating a cylindrical substrate so as to draw the nanofiber yarn through the channel at a first rate.

4. The method of claim 3, wherein applying the tensile force further comprises providing the nanofiber yarn at a second rate different from the first rate, the difference between the first rate and the second rate causing the tensile force to be applied to the nanofiber yarn.

5. The method of claim 1, further comprising placing a compliant flange in contact with the substrate, the compliant flange attached to the guide and providing a resilient force for maintaining a uniform distance between the guide and the substrate during relative movement between the guide and substrate.

6. The method of claim 1, further comprising causing relative movement between the guide and substrate for causing a length of nanofiber yarn to be attached to the substrate.

7. The method of claim 6, wherein causing the relative movement between the guide and the substrate comprises rotating the substrate.

8. The method of claim 6, wherein causing the relative movement between the guide and the substrate comprises laterally translating the substrate and the guide relative to one another.

9. The method of claim 1, wherein the pitch is 2 microns.

10. The method of claim 9, wherein the first portion and the second portion are discontinuous from one another.

11. The method of claim 1, wherein the nanofiber yarn has a diameter of less than 5 microns.

12. The method of claim 1, wherein the nanofiber yarn is a multi-ply yarn.

* * * * *